United States Patent

[11] 3,621,956

| [72] | Inventors | David S. Suckow<br>Decatur;<br>Larry G. Warren, Peoria, both of Ill. |
|---|---|---|
| [21] | Appl. No. | 2,717 |
| [22] | Filed | Jan. 14, 1970 |
| [45] | Patented | Nov. 23, 1971 |
| [73] | Assignee | Caterpillar Tractor Co.<br>Peoria, Ill. |

[54] PARKING BRAKE AND TRANSMISSION INTERLOCK
3 Claims, 2 Drawing Figs.

[52] U.S. Cl. .................................................. 192/4 A,
188/170
[51] Int. Cl. .................................................. F16h 57/10
[50] Field of Search ............................................
192/4 A, 4
R, 12 C, 18 A, 17 A, 13

[56] References Cited
UNITED STATES PATENTS

| 2,003,351 | 6/1935 | Eells | 194/4 C X |
| 3,344,896 | 10/1967 | Rasmussen | 192/17.1 X |
| 3,063,528 | 11/1962 | Wood | 192/13 |
| 2,812,837 | 11/1957 | Khan | 192/4 A |
| 2,411,455 | 11/1946 | Mullins et al. | 192/4 A |
| 3,480,120 | 11/1969 | Lenzen et al. | 192/4 C |

*Primary Examiner*—Benjamin W. Wyche
*Attorney*—Fryer, Tjensvold, Feix, Phillips & Lempio ABSTRACT: A control system for a vehicle having a parking brake and a transmission is provided with a mechanical lever system and valve arrangement which prevents shifting the transmission into gear when the parking brake is engaged.

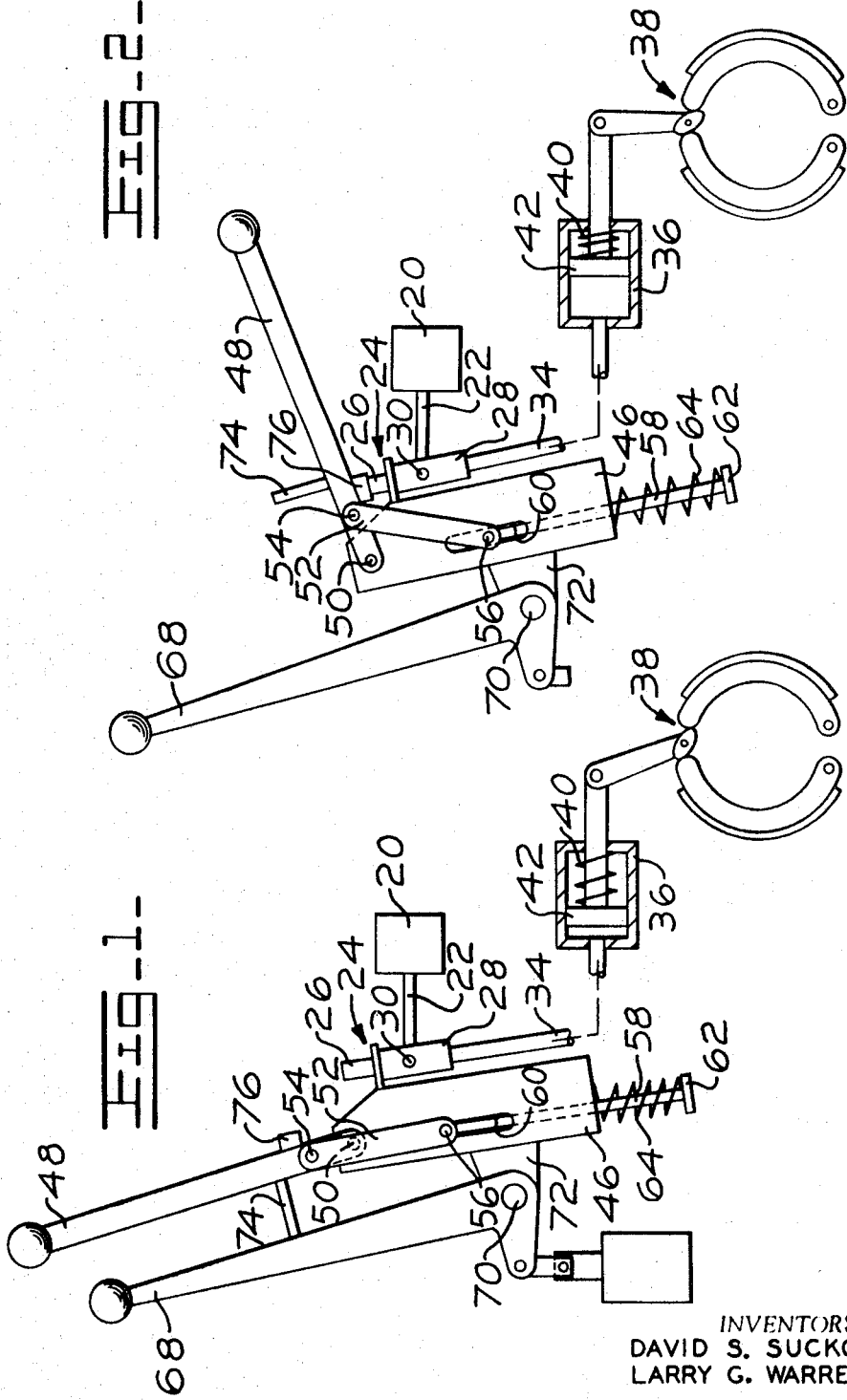

PARKING BRAKE AND TRANSMISSION INTERLOCK

BACKGROUND OF THE INVENTION

This invention relates to a mechanical linkage and valve system employed on a vehicle for locking the transmission shift linkage in neutral when the parking brake valve is applied. The lever arrangement is also adapted to allow the transmission to be reengaged when the parking brake is released.

The invention is particularly adaptable to machines having engines of sufficient torque to overpower the parking brake. Many present day machines have warning devices, such as a dash mounted indicator and/or a buzzer which operate when the air pressure in the parking brake system is low, indicating that the parking brake is engaged. However, there are many situations where the operator either is not aware that the warning devices are on or has chosen to ignore the warning devices and has driven the machine with the parking brake applied. The resulting heat buildup soon destroys the parking brake lining, thereby making it useless as a backup or emergency brake.

Accordingly, a principle object of the present invention is to provide a lever system and valve arrangement which will not only lock the transmission of the vehicle in a neutral condition whenever the parking brake is engaged, but also allow the transmission to be reengaged when the parking brake is released.

Another object of the invention is the provision of a parking brake control system which will automatically function to apply the parking brake should the air pressure in the system drop below a predetermined level.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS.

FIG. 1 is a schematic view, partially in section, illustrating the condition of the major components of the system when the parking brake is engaged; and FIG. 2 is a schematic view, partially in section, illustrating the condition of the major components of the system when the parking brake is released.

DETAILED DESCRIPTION OF THE PREFERRED EMBODIMENT

As shown in FIG. 1, a suitable air source 20 contains pressurized air for delivery through a conduit 22 to a mechanically operated control valve shown generally at 24. The control valve 24 is provided with a movable valve spool having an upper portion 26 which extends from the top of the valve housing 28.

The valve spool 26 is normally biased to the upper position shown in FIG. 1 by a spring (not shown) in the housing 28. The control valve 24 is also provided with an exhaust port 30 the purpose of which will be more fully understood at a later point in the description. The control valve 24 may be operated to one of two positions. In FIG. 1 the control valve 24 is shown in a closed position wherein the valve spool 26 is moved to its uppermost position which blocks fluid communication between the conduit 22 and a conduit 34 and simultaneously exhausts air pressure in the conduit 34 to the atmosphere by way of the exhaust port 30.

The conduit 34 communicates with a spring-loaded cylinder 36 which is operable to actuate a conventional parking brake 38 by means of a spring 40 which urges a piston 42 to the left to engage the brake when air is evacuated from the head end of the cylinder 36. Thus, the brake 38 will be engaged when the control valve 24 is in the closed position of FIG. 1 since at this time conduit 34 will be vented to the atmosphere through the exhaust port 30 of the control valve.

As shown in FIG. 1 the control valve 24 is attached to a housing 46. A hand-actuated parking brake control lever 48 is pivotally attached at 50 to housing 46. A link 52 attaches to lever 48 at 54 and at 56 to a spring-loaded rod 58 which is contained inside the housing 46. The housing 46 is provided with a slot 60 for guiding the movement of the lower end of the link 52 when lever 48 is moved overcenter in relation to its pivot point 50. The rod 58 extends downwardly through the housing and projects from the bottom thereof terminating in an enlarged head portion 62. A coil spring 64 is confined between the lower end of the housing 46 and the enlarged head portion 62 of the rod 58 to normally bias the rod 58 in a downward direction.

A transmission gear shift lever 68 is pivotally attached at 70 to an extension 72 of the housing 46. The parking brake control lever 48 is provided with a rodlike member 74 which under the biasing force of spring 64 and the brake levers overcenter condition locks the gear shift lever 68 in a neutral position when the brake control lever 48 is moved to the position shown in FIG. 1. The parking brake control lever 48 is also provided with a buttonlike projection 76 which is adapted to engage the top portion of the control valve spool 26 which is opened by the recoiling force of spring 64 when the lever 48 is pivoted about pivot point 50 to the position shown in FIG. 2.

When the parking brake control lever 48 is moved to the position shown in FIG. 2 the button 76 on the lever 48 contacts the top of the spool 26 and moves the spool 26 downwardly to open the control valve 24. When the control valve 24 is in an open position the exhaust port 30 is closed and pressurized air is transmitted from the air source through the conduit 22 to the conduit 34 which causes the piston 42 of the parking brake cylinder 36 to move to the right thereby releasing the parking brake.

It should be noted that when the parking brake lever is in the position shown in FIG. 2 and the control valve 24 is open, the coil spring 64 tends to push the rod 58 downwardly. The downward force exerted on the rod 58 of the spring 64 is also transmitted to the parking brake lever 48 by way of the link 52 so that the lever 48 tends to remain in the position shown. It should also be noted that when the parking brake lever 48 is in the position shown in FIG. 2 the gear shift lever 68 may be moved to engage the transmission.

It may also be observed that if air pressure is suddenly lost when the parking brake is in the released position of FIG. 2, the spring 40 will force the piston 42 to the left thereby engaging the brake 38. This latter feature makes the parking brake useful as an emergency backup brake in case there is a loss of air pressure in the brake system.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a system for a vehicle having a transmission, a gear shift lever associated with said transmission and at least one fluid-controlled parking brake, the combination comprising: a source of fluid under pressure; a manually operable brake control lever means; manually operable valve means actuateable by said brake control lever means to move to a first position in which it blocks fluid from said parking brake, mechanical means associated with said parking brake to automatically engage the parking brake when said valve means is in said first position, said brake control lever means having means simultaneously operating to lock said gear shift lever in a neutral position; said manually operable valve means further actuateable by said brake control lever means to move to a second position in which it directs fluid under pressure to said parking brake to override said mechanical means and to disengage said parking brake, said brake control lever means simultaneously operating to permit free and independent movement of said gear shift lever to a position in which it engages said transmission.

2. A system as set forth in claim 1 wherein the means for automatically engaging said parking brake comprises a load cylinder means including a spring means normally urging a first face means of a piston means in a first direction to engage said parking brake; said system further including: conduit means interconnecting said fluid source, said valve means and said load cylinder means; said valve means in said first position blocking fluid communication between said source and said load cylinder means, thereby permitting said load cylinder spring means to move said piston means in a direction which engages said parking brake; said valve means in said second position communicating fluid pressure from said source through said valve means to a second face means of said piston means to overcome said load cylinder spring means and to move said piston means in a second direction which disengages said parking brake.

3. The invention of claim 1 wherein said means to lock said gear shift lever in a neutral position include an abutment member affixed to said brake control lever means and which physically engages said gear shift lever.

* * * * *